United States Patent [19]

Arnason

[11] 4,161,642
[45] Jul. 17, 1979

[54] CUTTING AND GOUGING HEAD FOR WELDING EQUIPMENT

[76] Inventor: Walter Arnason, 807 2nd Avenue, Castelgar, British Columbia, Canada, V1N 1L2

[21] Appl. No.: 852,857

[22] Filed: Nov. 18, 1977

[30] Foreign Application Priority Data

Nov. 29, 1976 [CA] Canada .................................. 266772

[51] Int. Cl.² .............................................. B23K 9/00
[52] U.S. Cl. ..................................... 219/70; 219/138
[58] Field of Search ................... 219/70, 144, 138, 74

[56] References Cited

U.S. PATENT DOCUMENTS

| | | | |
|---|---|---|---|
| 1,324,337 | 12/1919 | Chapman | 219/70 |
| 2,726,309 | 12/1955 | Stepath | 219/70 |
| 3,042,791 | 7/1962 | Reeh | 219/75 |
| 3,624,339 | 11/1971 | Jenkins | 219/70 |
| 3,651,302 | 3/1972 | Maddison | 219/70 |

*Primary Examiner*—E. A. Goldberg
*Attorney, Agent, or Firm*—Smyth, Pavitt, Siegemund, Jones & Martella

[57] ABSTRACT

A head attachable to the insulated handle normally used to support an electrode employed in electric arc welding. The head supports an electrode and combines with the handle to provide a torch which allows cutting and gouging to be performed by conventional welding equipment. A conductive body of the head electrically connects the electrode to the handle and compressed air is delivered through the body to a jet nozzle on the end of the body in which the electrode is adjustably mounted. The air discharges from the jet nozzle as a stream which travels longitudinally of the electrode to impinge on the workpiece and blow away molten metal at the tip of the electrode.

6 Claims, 6 Drawing Figures

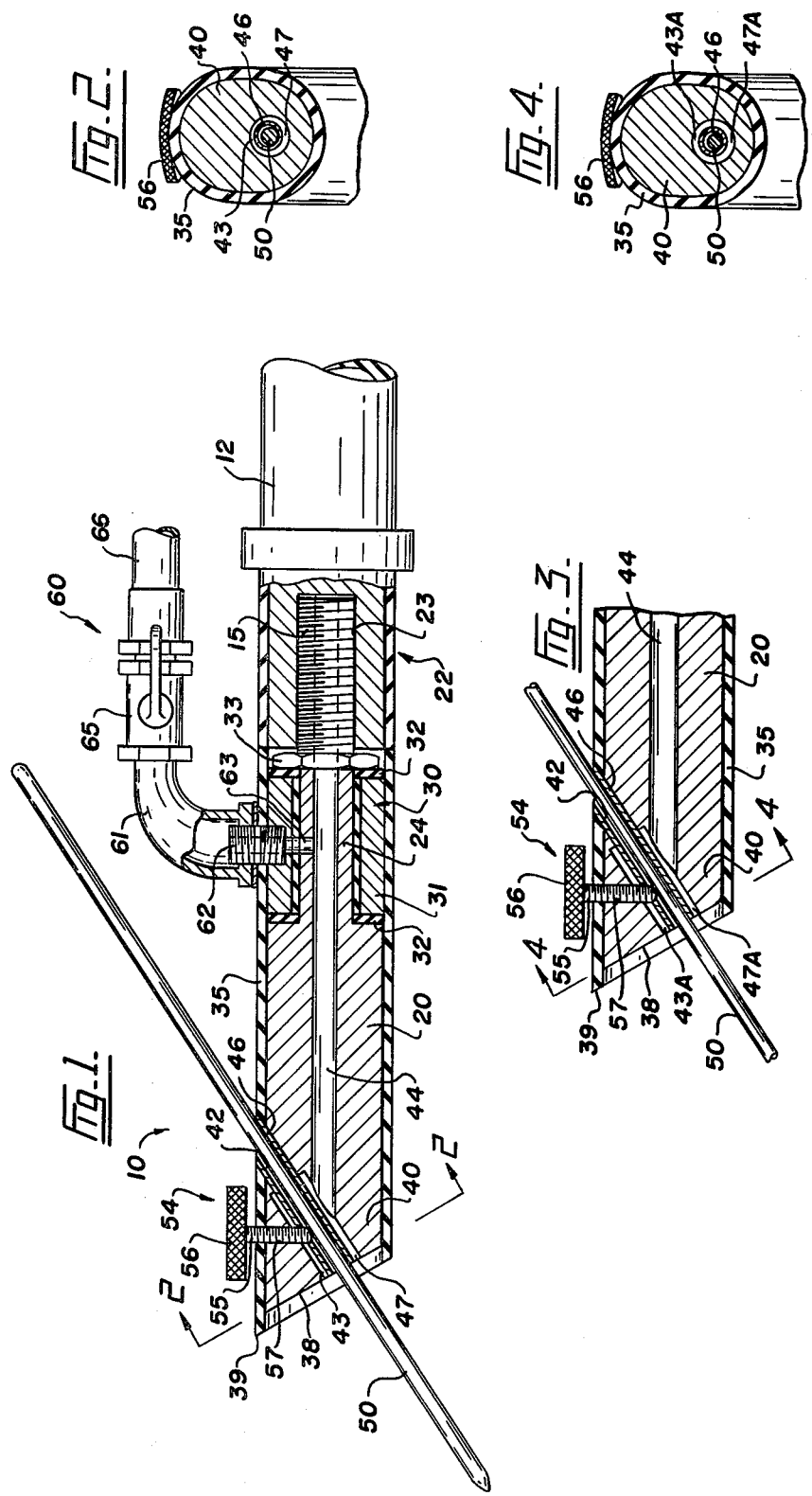

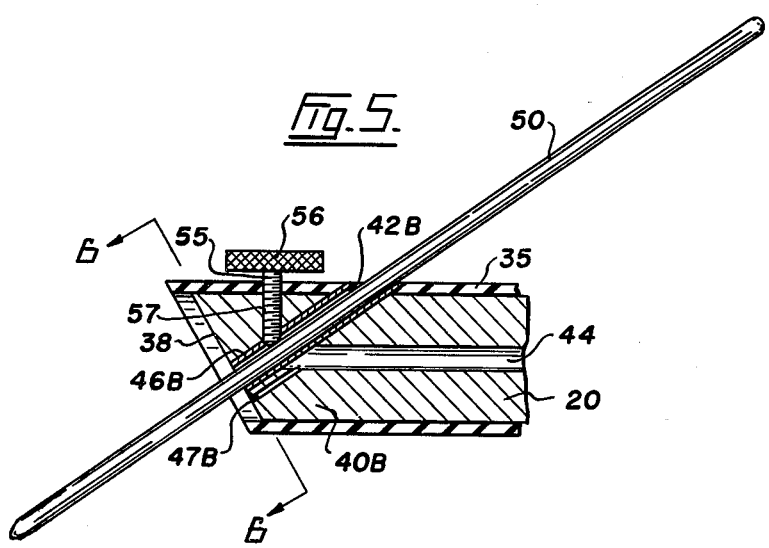
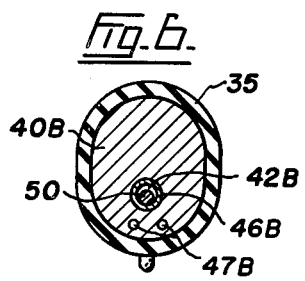

CUTTING AND GOUGING HEAD FOR WELDING EQUIPMENT

My invention relates generally to an accessory which allows welding equipment to be used to gouge and cut metal, and more particularly, to such a device which utilizes an air jet to sweep away metal particles.

The welding equipment which is commonly found in shops and elsewhere represents a considerable capital outlay and often is not equipped with a separate torch which will allow such tasks as cutting and gouging to be done. This invention provides a very inexpensive and effective attachment which enables a conventional electrode holder to be converted into a cutting and gouging torch.

More particularly, the present invention provides a cutting and gouging head for an electrode holder of an electric arc welder which head comprises an electrically conductive body having a longitudinal passage extending between inner and outer ends of said body, coupling means for electrically connecting the inner end to the holder, insulating means for electrically isolating exterior portions of the body, said outer end having an end face and a bore open to said end face, a tubular member mounted in the bore, clamping means on the outer end adapted to secure an electrode rod within the tubular member and projecting beyond the end face, said outer end having a jet nozzle extending from the end face to the longitudinal passage and located near the tubular member, and air supply means mounted on the body for supplying pressurized air to the passage whereby air is discharged from the jet nozzle to flow longitudinally of the electrode rod.

In drawings which illustrate preferred embodiments of the invention;

FIG. 1 is a longitudinal section, part in elevation, showing a cutting and gouging head in accordance with one embodiment of the invention, FIG. 2 is a transverse section taken on the line 2—2 of FIG. 1, FIG. 3 is a longitudinal section showing the outer end only of another embodiment of the invention, FIG. 4 is a transverse section taken on the line 4—4 of FIG. 3, FIG. 5 is a longitudinal section showing the outer end only of still another embodiment of the invention, and FIG. 6 is a transverse section taken on the line 6—6 of FIG. 5.

Referring to the drawings, the numeral 10 indicates a cutting and gouging head constructed in accordance with one embodiment of this invention. The head 10 is adapted to be attached to a handle-like member 12 commonly referred to as a short stub electrode holder and which forms an essential part of all conventional electric arc welders. This holder or handle 12, see FIG. 1 only, is secured at one end to the cables (not shown) which supply electric power to the handle. At the opposite end of the holder 12, there is a threaded socket 15 for the spigot of a renewable head, also not illustrated. It is this head which normally supports a welding rod and both the head and the rod are removed and replaced by the present invention when the welding equipment is to be used for cutting and gouging.

The head 10 comprises a cylindrical body 20, which is secured to the holder 12 by coupling means generally indicated at 22. In FIG. 1, the means 22 is shown to comprise a threaded spigot 23 which forms an extension of a reduced inner end 24 of the body. The spigot 23 is of a size to fit the socket 15 normally coupled by the corresponding portion of the welding rod-supporting head.

The exterior of the electrically-conductive body 20 must be insulated from the interior of the holder 12 and, for this purpose, I provide means generally indicated at 30. FIG. 1 shows the insulating means 30 as comprising a metal collar 31 and a pair of washers 32, the washers being of a suitable insulating material such as fibre. The two washers and collar are secured to the inner end 24 of the body by a nut 33 so that the several parts can be securely clamped together. Finally, the insulating means 30 includes an outer sleeve 35 which is fitted over the cylindrical body 20 to cover the collar 31 as well as the nut 33. Sleeve 35 extends forwardly from the nut 33 to project a short distance beyond a bevelled face 38 on an outer end 40 of the body. This provides the sleeve with an outer end edge 39 which prevents the conductive body 20 from making electrical contact with the workpiece during the gouging operation.

Outer end 40 of the body is provided with a diagonally disposed bore 42 which extends through the insulating sleeve 35. End face 38 of the body is drilled to provide a counterbore 43 which connects with a passage 44 extending longitudinally of the body from the inner end of the spigot 23. The counterbore 43 is slightly eccentric with respect to the bore 42, the eccentricity being most apparent in FIG. 2. A thin-walled metal tube 46 is suitably secured within the bore 42 to extend longitudinally of the counterbore. Between the end face 38 and the passage 44, the tube 46 and the inner surface of the counterbore define a jet nozzle 47. It will be noted the volume of the jet nozzle remains constant because of the use of the tube and does not vary with the diameter of the rod.

The tube 46 is adapted to slidably support an electrode rod 50 suitable for cutting and gouging. These rods 50 come in various sizes and the tube 46 has an internal diameter large enough to accommodate the largest such rod likely to be supported by the head 10. The tube 46 ensures proper electrical contact between the electrode rod and the body 20 regardless of the diameter of that rod. Clamping means generally indicated at 54 serves to adjustably secure the rod 50 within the tube 46. As shown, the means 54 comprises simply a bolt 55 having a large, insulated head 56. The bolt 55 is threaded through an opening 57 to engage the rod 50 and hold it in a position to project a selected distance beyond the end face 38.

The cutting and gouging head 10 is provided with air supply means generally indicated at 60. FIG. 1 shows the means 60 as comprising an elbow fitting 61 which engages the insulating sleeve 35 midway between the washers 32. A nipple 62 secures this fitting to the collar 31 in alignment with a hole 63 in the collar, which hole connects with the passage 44. The fitting 61 carries a control valve 65 which is connected by a length of hose 66 to the source of compressed air associated with conventional welding equipment.

When welding equipment is required to be used to cut or gouge a metal plate for example, the conventional head is removed from the holder 12 and is replaced by the present head 10. A rod 50 is secured to the head 10 by the clamping means 54. The operator closes an electric switch to connect the power source of the welder to the electrode rod 50, and then opens the valve 65 to supply only the required amount of pressurized air to the jet nozzle 47 before applying the tip of the rod to the work piece. Air travels as an eccentric, high-velocity stream which encloses the electrode rod 50 from the end of the tube 46 to the tip of the rod before impinging on the workpiece to clear away molten metal which would otherwise gather at the tip. A major portion of the annular stream of air is directed towards the underside of the rod due to the eccentric disposition of the jet nozzle, and therefore the molten metal is blown away in a direction determined by the way the operator holds the torch. The air flowing longitudinally of the rod also serves to cool the electrode which is believed to make it last longer.

Referring now to FIGS. 3 and 4 which show only an outer end of a slightly modified head. This head is constructed as previously described and enumerated except that a counterbore 43A is drilled concentric with the bore 42.

The embodiment shown in FIGS. 3 and 4 operates in the above described manner except that the annular air stream is uniformly applied to the work piece due to the concentric disposition of the jet nozzle 47A.

FIGS. 5 and 6 illustrate still another embodiment of the present invention. This cutting and gouging head is constructed as before except that outer end 40B of the body 20 is provided with a cylindrical through bore 42B. A tube 46B is secured within the bore, the tube preferably being a press fit therein. Near the bore 42B, the end 40B is drilled to provide two air outlets which extend from the outer face 38 to passage 44 with their axes parallel to the axis of the bore and therefore the tube, the air outlets together providing a jet nozzle 47B.

The embodiment shown in FIGS. 5 and 6 is operated substantially as previously described except that it is used for gouging and cutting operations where lesser amounts of air are required and where it is not necessary and/or desirable for the air stream being discharged from the tool to envelope the rod 50. Such a modified head is easier and less costly to manufacture.

From the foregoing, it will be apparent I have provided an accessory for conventional welding equipment which will make the equipment more versatile than was formerly the case. The head 10 can be quickly and easily attached, without the use of special tools, to a commonly-used holder of the equipment to convert the holder into a torch particularly well suited for use in gouging and/or cutting metal as well as the bevelling and piercing which can also be done with the present tool. A gouging operation, for example, can be performed in any required direction without the need of adjustment to the head.

I claim:

1. A cutting and gouging head for an electrode holder of an electric arc welder comprising an electrically conductive body having a longitudinal passage extending between inner and outer ends of said body, couplings means for electrically connecting the inner end to the holder, insulating means electrically isolating exterior portions of the body; said outer end having an end face, a bore, and a counterbore connected to the longitudinal passage and open to said end face; a tubular member mounted in the bore to extend longitudinally of the counterbore, said tubular member having an outer surface spaced from an inner surface of the counterbore to define therewith an annular jet nozzle of a constant volume, clamping means on the outer end adapted to secure an electrode rod within the tubular member with one end of said electrode rod projecting beyond the end face, and air supply means mounted on the body for supplying pressurized air to the longitudinal passage whereby air is discharged from the annular jet nozzle to flow longitudinally of the electrode rod as a substantially annular stream.

2. A cutting and gouging head as claimed in claim 1, in which said annular jet nozzle is concentric with respect to the bore.

3. A cutting and gouging head as claimed in claim 1, in which said annular jet nozzle is eccentric with respect to the bore.

4. A cutting and gouging head as claimed in claim 1, in which said air supply means includes an air valve near the coupling means.

5. A cutting and gouging head as claimed in claim 4, in which said coupling means comprises a threaded spigot on the inner end of the body and a threaded socket on the electrode holder.

6. A cutting and gouging head as claimed in claim 1, in which said air supply means includes an extenal air value.

* * * * *